(12) United States Patent
Platvoet et al.

(10) Patent No.: US 6,685,893 B2
(45) Date of Patent: Feb. 3, 2004

(54) PYROLYSIS HEATER

(75) Inventors: Erwin M. J. Platvoet, Jersey City, NJ (US); Robert J. Gartside, Summit, NJ (US)

(73) Assignee: ABB Lummus Global Inc., Bloomfield, NJ (US)

( * ) Notice: Subject to any disclaimer, the term of this patent is extended or adjusted under 35 U.S.C. 154(b) by 97 days.

(21) Appl. No.: 09/841,277

(22) Filed: Apr. 24, 2001

(65) Prior Publication Data

US 2002/0155046 A1 Oct. 24, 2002

(51) Int. Cl.[7] .............................. F23D 14/12; F23D 3/40
(52) U.S. Cl. ........................ 422/198; 431/326; 431/328; 208/46; 585/648; 110/317
(58) Field of Search ................................. 431/328, 326; 422/197–198; 122/333; 208/130, 132, 46; 196/110, 116; 585/648; 432/159; 110/317, 319, 203; 204/193

(56) References Cited

U.S. PATENT DOCUMENTS 3,274,987 A * 9/1966 Hastings ...................... 126/25
4,342,642 A    8/1982 Bauer et al. ................ 208/130
5,409,375 A * 4/1995 Butcher ....................... 431/328

OTHER PUBLICATIONS

*Ethylene—Keystone to the Petrochemical Industry*, Kniel, Ludwig et al; pp. 128–134; Marcel Dekker, Inc.; 1980.

* cited by examiner

Primary Examiner—Jerry D. Johnson
Assistant Examiner—Alexa A. Doroshenk
(74) Attorney, Agent, or Firm—Alix, Yale & Ristas, LLP

(57) ABSTRACT

A pyrolysis heater particularly for the cracking of hydrocarbons in the production of olefins has a burner arrangement in the firebox which directly heats the hearth of the firebox such that it becomes a radiant surface. This improves the heat flux in the lower portion of the firebox and produces a more uniform vertical heat flux profile over the firebox elevation. The base burners may fire horizontally across the hearth or may comprise porous ceramic burners as a part of the hearth. The base burners operate along with vertically firing hearth burners and optional wall burners in the upper portion of the firebox.

8 Claims, 10 Drawing Sheets

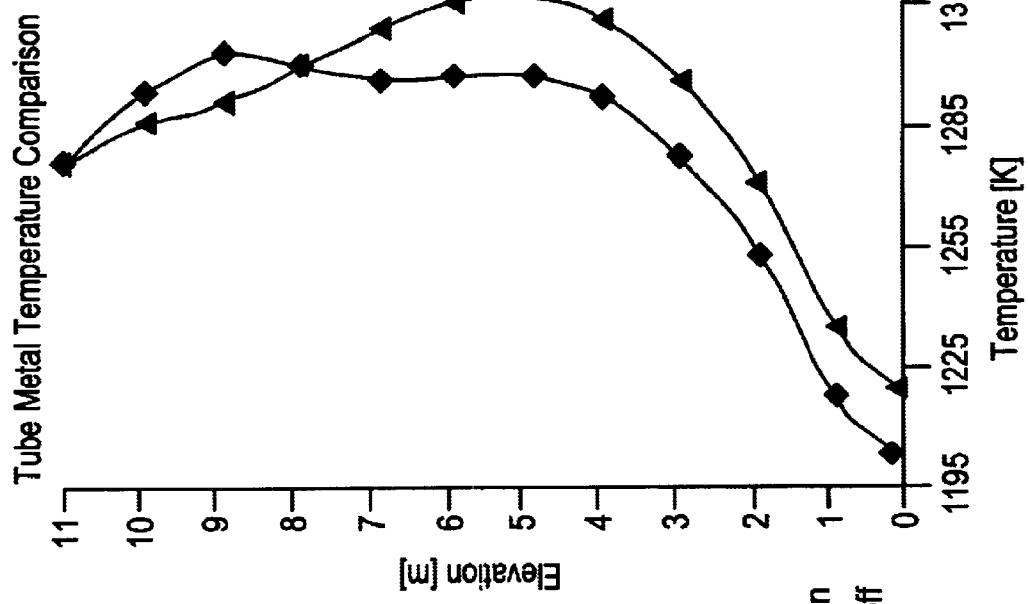
FIG. 3 Tube Metal Temperature Comparison
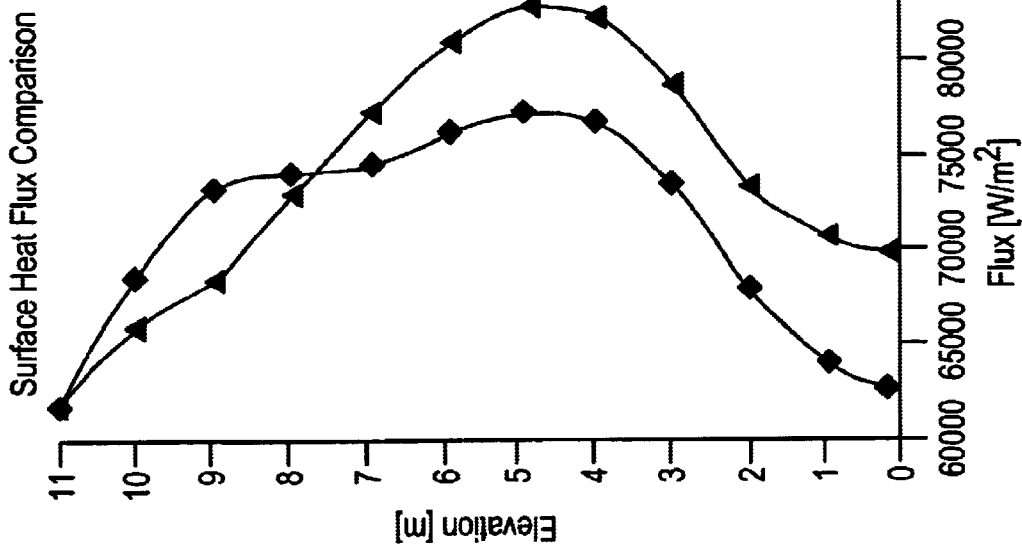
FIG. 2 Surface Heat Flux Comparison Surface Heat Flux-Pass 4

Surface Heat Flux-Pass 3

PYROLYSIS HEATER

BACKGROUND OF THE INVENTION

The present invention relates to a heater for the pyrolysis of hydrocarbons and particularly to a heater for the steam cracking of paraffins to produce olefins.

The steam cracking or pyrolysis of hydrocarbons for the production of olefins is almost exclusively carried out in tubular coils located in fired heaters. The pyrolysis process is considered to be the heart of an olefin plant and has a significant influence on the economics of the overall plant.

The hydrocarbon feedstock may be any one of the wide variety of typical cracking feedstocks such as methane, ethane, propane, butane, mixtures of these gases, naphthas, gas oils, etc. The product stream contains a variety of components the concentration of which are dependent in part upon the feed selected. In the conventional pyrolysis process, vaporized feedstock is fed together with dilution steam to a tubular reactor located within the fired heater. The quantity of dilution steam required is dependent upon the feedstock selected; lighter feedstocks such as ethane require lower steam (0.2 lb./lb. feed), while heavier feedstocks such as naphtha and gas oils require steam/feed ratios of 0.5 to 1.0. The dilution steam has the dual function of lowering the partial pressure of the hydrocarbon and reducing the carburization rate of the pyrolysis coils.

In a typical pyrolysis process, the steam/feed mixture is preheated to a temperature just below the onset of the cracking reaction, typically 650° C. This preheat occurs in the convection section of the heater. The mix then passes to the radiant section where the pyrolysis reactions occur. Generally the residence time in the pyrolysis coil is in the range of 0.2 to 0.4 seconds and outlet temperatures for the reaction are on the order of 700° to 900° C. The reactions that result in the transformation of saturated hydrocarbons to olefins are highly endothermic thus requiring high levels of heat input. This heat input must occur at the elevated reaction temperatures. It is generally recognized in the industry that for most feedstocks, and especially for heavier feedstocks such as naphtha, shorter residence times will lead to higher selectivity to ethylene and propylene since secondary degradation reactions will be reduced. Further it is recognized that the lower the partial pressure of the hydrocarbon within the reaction environment, the higher the selectivity.

The flue gas temperatures in the radiant section of the fired heater are typically above 1,100° C. In a conventional design, approximately 32 to 40% of the heat fired as fuel into the heater is transferred into the coils in the radiant section. The balance of the heat is recovered in the convection section either as feed preheat or as steam generation. Given the limitation of small tube volume to achieve short residence times and the high temperatures of the process, heat transfer into the reaction tube is difficult. High heat fluxes are used and the operating tube metal temperatures are close to the mechanical limits for even exotic metallurgies. In most cases, tube metal temperatures limit the extent to which residence time can be reduced as a result of a combination of higher process temperatures required at the coil outlet and the reduced tube length (hence tube surface area) which results in higher flux and thus higher tube metal temperatures. The exotic metal reaction tubes located in the radiant section of the cracking heater represent a substantial portion of the cost of the heater so it is important that they be utilized fully. Utilization is defined as operating at as high and as uniform a heat flux and metal temperature as possible consistent with the design objectives of the heater. This will minimize the number and length of the tubes and the resulting total metal required for a given pyrolysis capacity.

In the majority of cracking furnaces, the heat is supplied by hearth burners that are installed in the floor of the firebox and fire vertically up along the walls. Because of the characteristic flame shape from these burners, an uneven heat flux profile is created. The typical profile shows a peak flux near the center elevation of the firebox, with the top and bottom portions of the firebox remaining relatively cold. In select heaters, radiant wall burners are installed in the top part of the sidewalls to equalize the heat flux profile in the top. Typical surface heat flux profiles and metal temperature profiles for a hearth burner and for a combination of hearth and wall burners at the same heat liberation rate show low heat flux and metal temperature in the lower portion of the firebox, which means that the coil in this portion is underutilized. Improving the hearth burner flux profile is difficult because of the additional $NO_x$ requirements, and because of the steadily increasing demand of higher burner heat releases. Another way to equalize the flux profile is using wall burners only, but since the maximum heat release of a wall burner is about 10 times less than that of a hearth burner, the number of burners would become excessive.

SUMMARY OF THE INVENTION

The present invention relates to pyrolysis heaters, particularly for the cracking of hydrocarbons for the production of olefins, with a burner arrangement in the firebox to improve the heat flux and metal temperature profile. The objective is to provide a burner arrangement which includes burners to heat the floor of the firebox so that it acts as a radiant surface to increase the heat flux to the reaction tubes in the lower part of the firebox and produce a more uniform vertical heat flux profile over the firebox elevation. These floor burners are called base burners and work along with vertically firing hearth burners and optionally with wall burners in the upper portion of the firebox. It is a further objective to increase the total heat transferred to the radiant cracking coil with no increase in the metal temperature of the coil.

BRIEF DESCRIPTION OF THE DRAWINGS

FIG. 2 is a graph showing a typical surface heat flux profile throughout the elevation of a prior art pyrolysis heater.

FIG. 3 is a graph showing a typical metal temperature profile throughout the elevation of a prior art pyrolysis heater.

DESCRIPTION OF THE PREFERRED EMBODIMENTS

Figure 1:
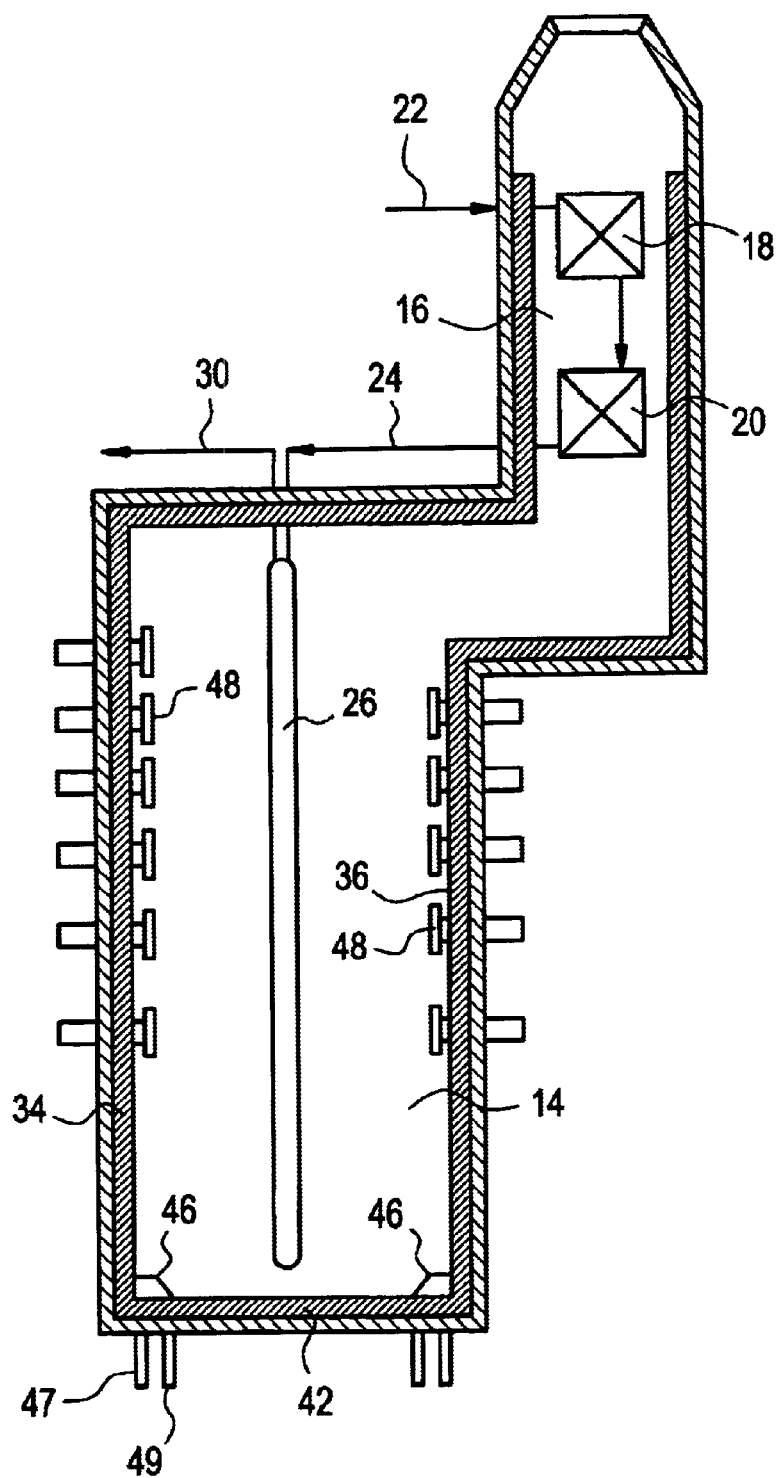
FIG. 1 is a simplified cross-section representation of a typical prior art pyrolysis heater.

Before describing the details of the preferred embodiments of the present invention, a typical prior art pyrolysis heater will be described along with graphs showing the operating parameters of those heaters. FIG. 1 shows a cross section of such a prior art heater. This heater has a radiant heating zone 14 and a convection heating zone 16. Located in the convection heating zone 16 are the heat exchange surfaces 18 and 20 which in this case are illustrated for preheating the hydrocarbon feed 22. This zone may also contain heat exchange surface for producing steam. The preheated feed from the convection zone is fed at 24 to the heating coil generally designated 26 located in the radiant heating zone 14. The cracked product from the heating coil 26 exits at 30. The heating coils may be any desired configuration including vertical and horizontal coils as are common in the industry.

The radiant heating zone 14 comprises walls designated 34 and 36 and floor or hearth 42. Mounted on the floor are the vertically firing hearth burners 46 which are directed up along the walls and which are supplied with air 47 and fuel 49. Usually mounted in the walls are the wall burners 48 which are radiant-type burners designed to produce flat flame patterns which are spread across the walls to avoid flame impingement on the coil tubes.

FIG. 2 shows a typical surface heat flux profile for a prior art heater such as illustrated in FIG. 1 with both the hearth burners and wall burners being on in one case and with the hearth burners being on and the wall burners being off in the other case. FIG. 3 shows the tube metal temperature under the same conditions. These figures show low heat flux and low metal temperatures in both the lower part of the firebox and the upper part of the firebox and show a large difference between the minimum and maximum temperature or heat flux. They clearly show a cool hearth and suggest the under utilization of the coil tubes near the hearth. FIG. 3 also shows the importance of firing profile upon peak tube metal temperature. When the wall burners are turned off, increased firing of the hearth burners is required. Due to the shape of the hearth burner heat release profile, tube metal temperatures increase by approximately 20° C. This increase has a direct negative impact on the cycle length due to fouling of a conventional cracking heater.

Figure 4A:
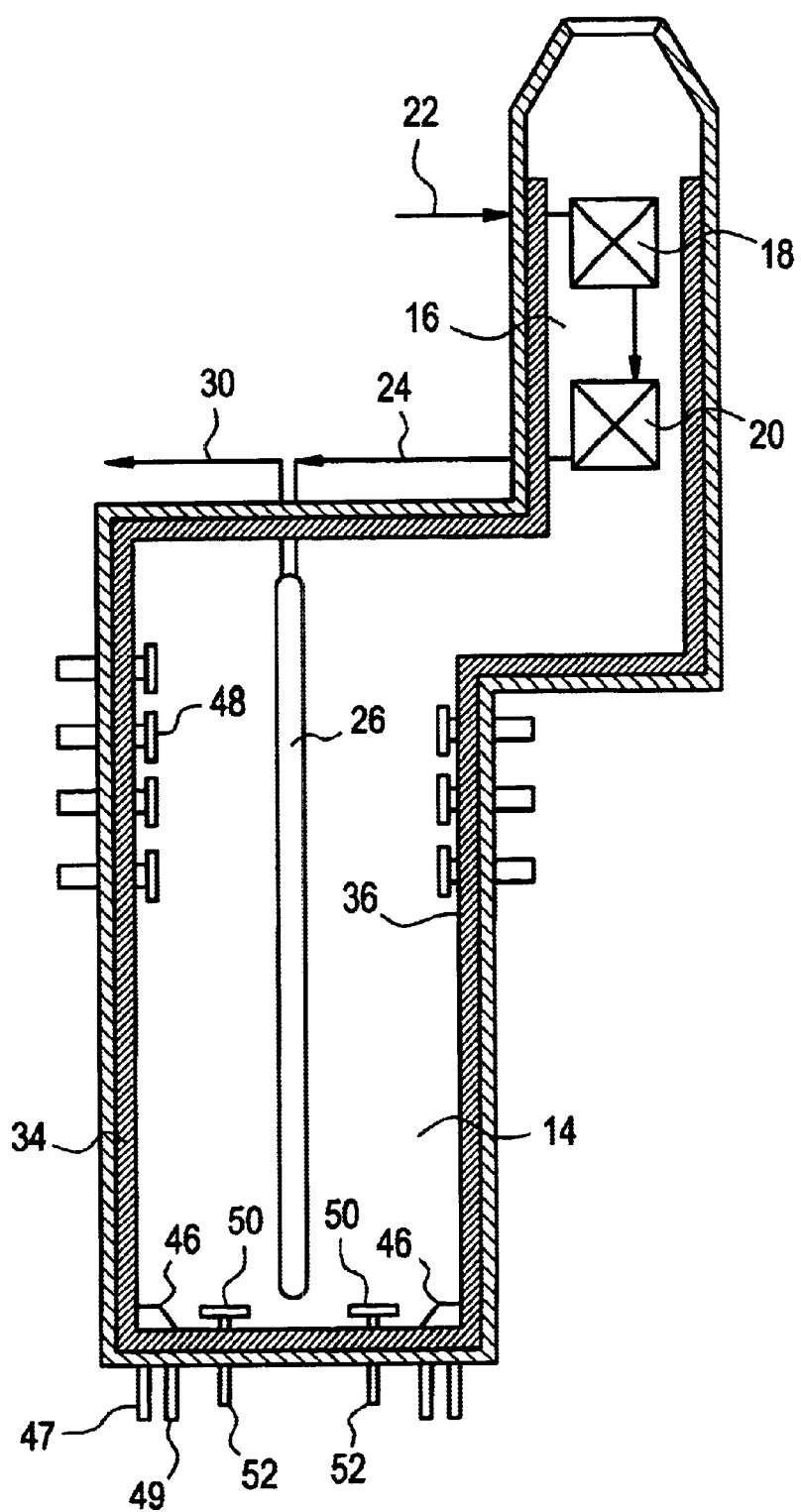
FIGS. 4A and 4B are simplified cross-section representations of pyrolysis heaters illustrating two variations of burner configurations according to the present invention.
Figure 4B:
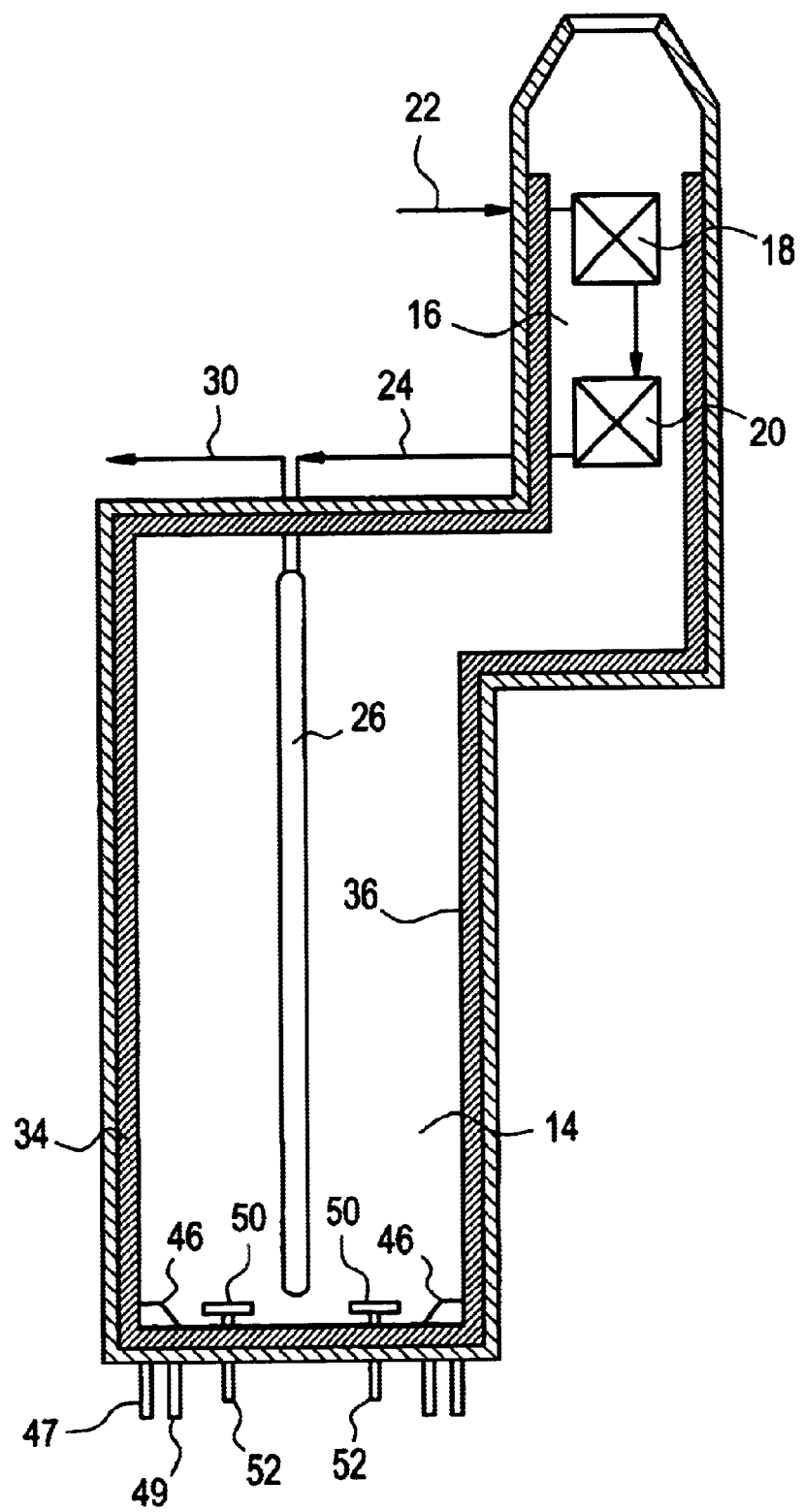
Figure 5:
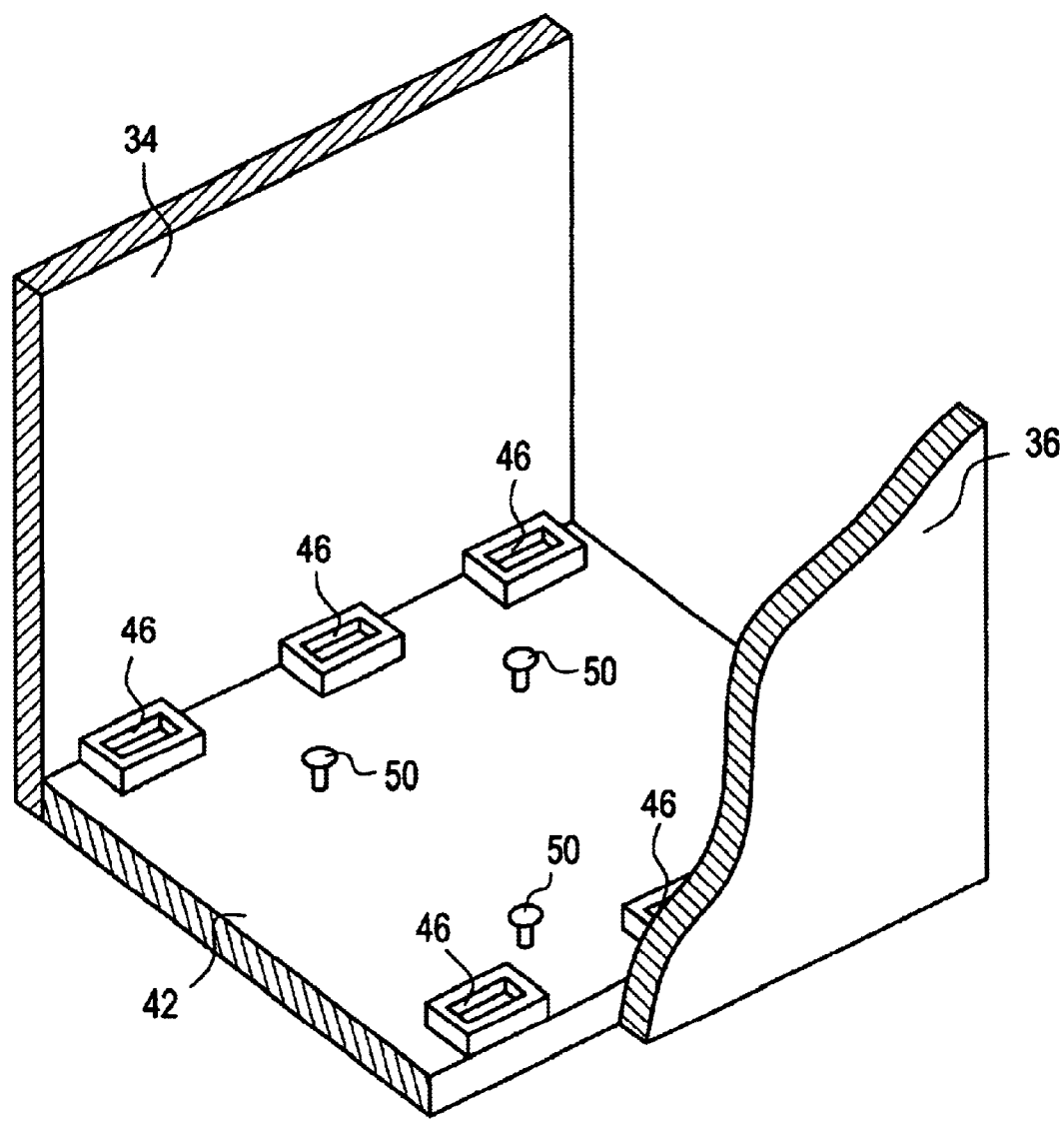
FIG. 5 is a perspective view of the lower portion of one part of a pyrolysis heater illustrating the base burners and hearth burners.
Figure 6:
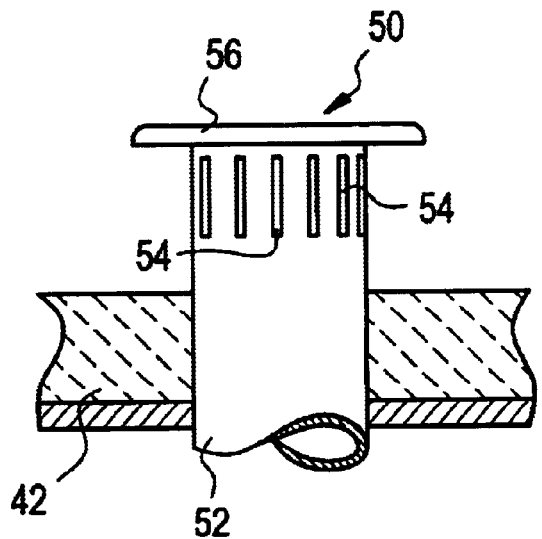
FIG. 6 illustrates an example of a base burner according to one embodiment of the invention.

FIGS. 4A and 4B illustrate pyrolysis heaters with burners configured according to one embodiment of the present invention with the radiant heating zone 14 of FIG. 4A showing a first variation with wall burners 48 in the upper portion of the radiant heating zone and the radiant heating zone 14 of FIG. 4B showing a second variation without wall burners. Although these FIGS. 4A and 4B depict a single-cell heater, the concept can be applied equally to multiple cell heaters or cracking heaters with a more open configuration. As seen in these FIGS. 4A and 4B and in FIG. 5 which shows a portion of the zone 14, base burners 50 are located on the floor or hearth 42. These base burners 50 are constructed to fire horizontally across the floor in order to heat the floor itself whereby it becomes a radiating surface. In the preferred embodiment, these base burners 50 are the same as or similar to the wall burners 48 in that they fire in a radial or elliptical flame pattern around the burner. An example is shown in FIG. 6 where the fuel/air mixture is introduced into the burner generally designated 50 through the conduit 52. The fuel/air mixture flows through the slots 54 under the cap 56 and is ignited. The flame is thereby directed horizontally by the slots and cap across the floor. The base burners can be operated at different heat release rates to provide more heat to the colder passes of the coil and less heat to the hotter passes. Also, the slots that are facing the coils can be blocked or omitted to avoid flame impingement on the coils.

Figure 7:
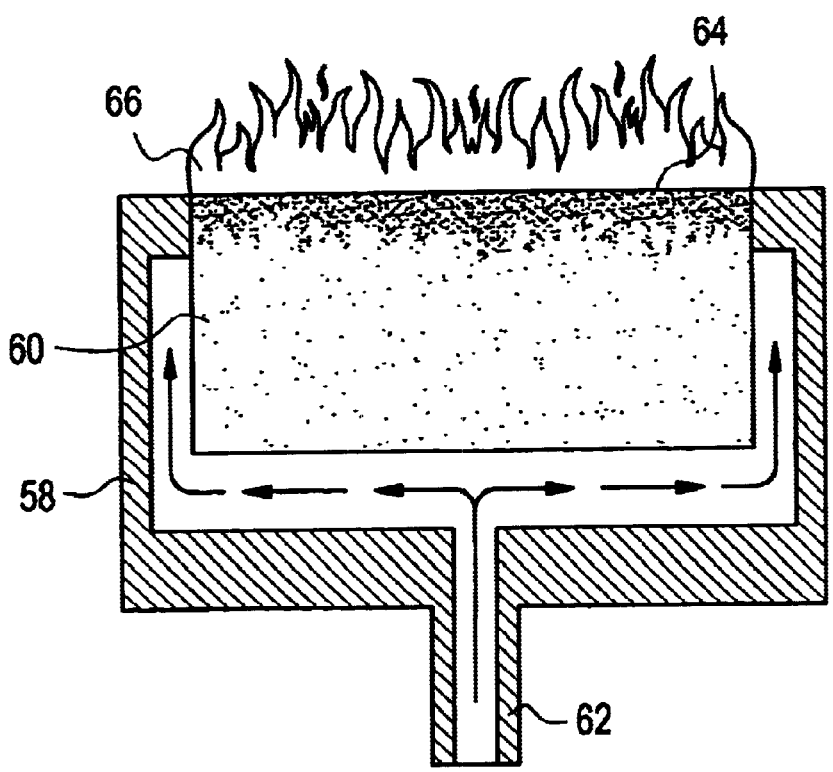
FIG. 7 is a cross-section view of an alternate base burner comprising a porous ceramic burner.
Figure 8B:
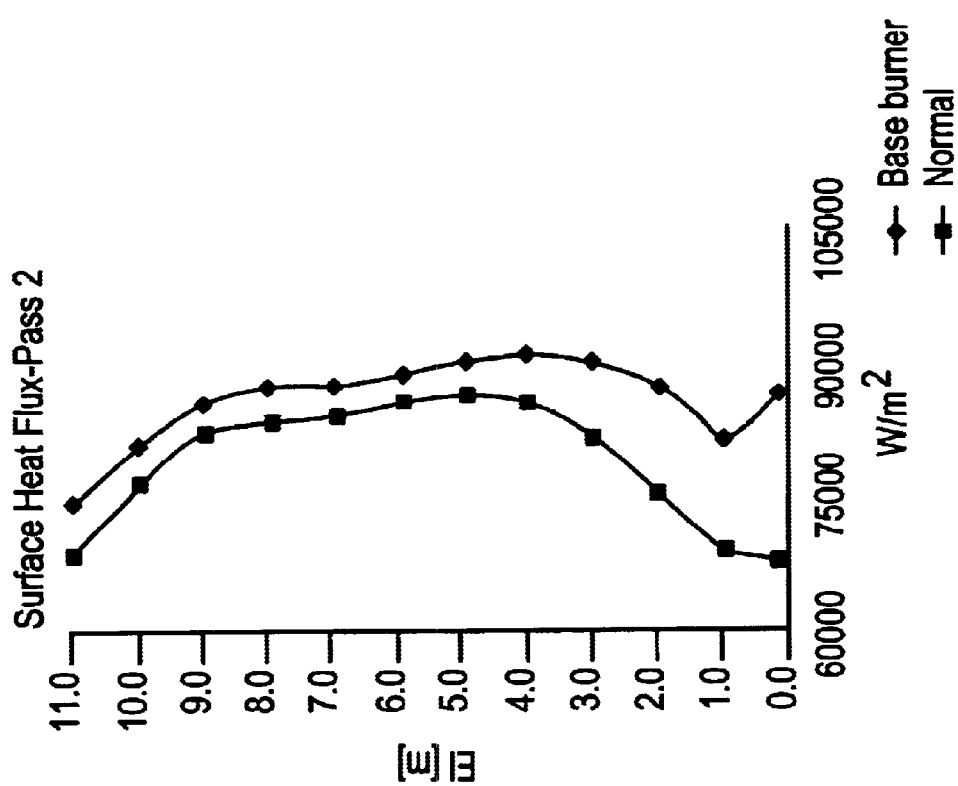
FIGS. 8A to 8D are graphs showing the surface heat flux through the elevation of a pyrolysis heater for four different passes comparing a prior art type heater with a heater of the present invention having base burners.
Figure 8A:
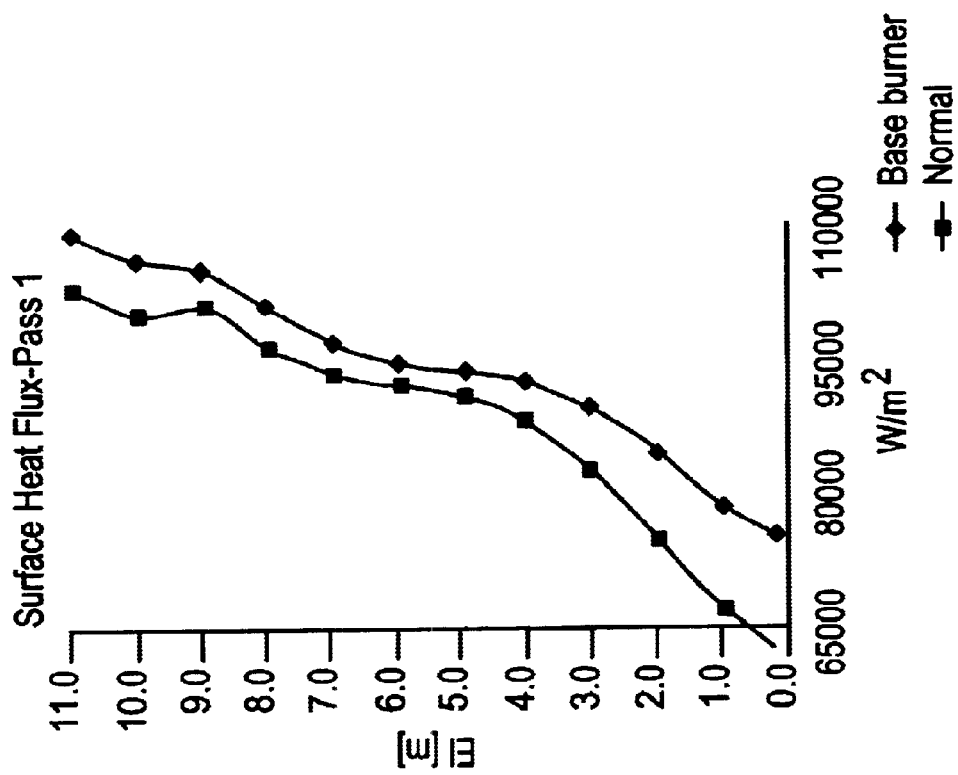
Figure 8D:
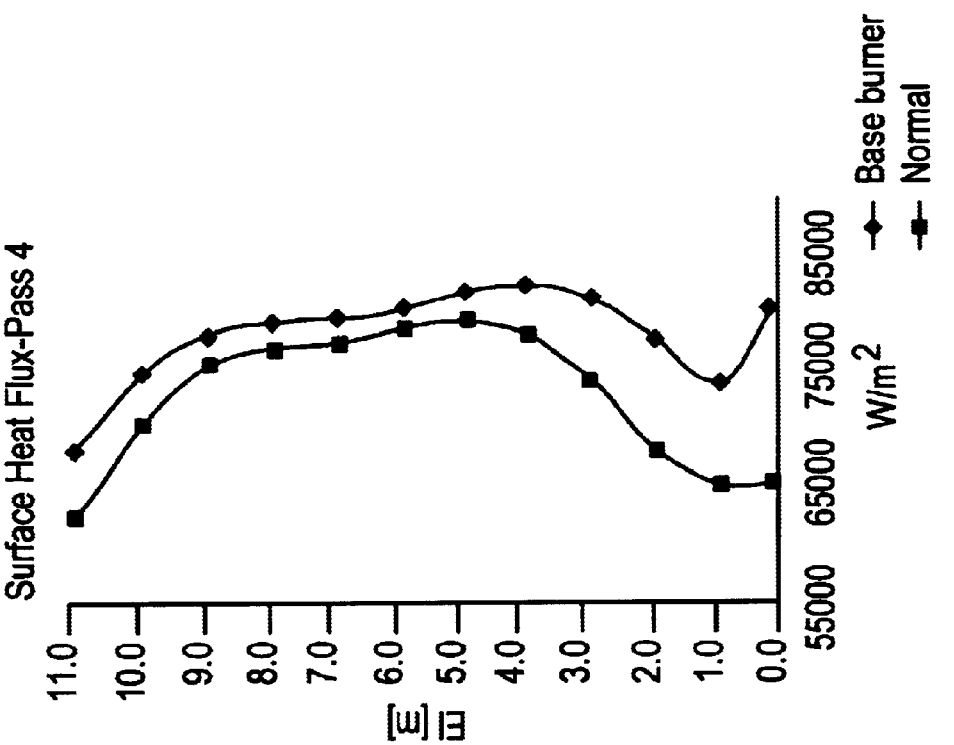
Figure 8C:
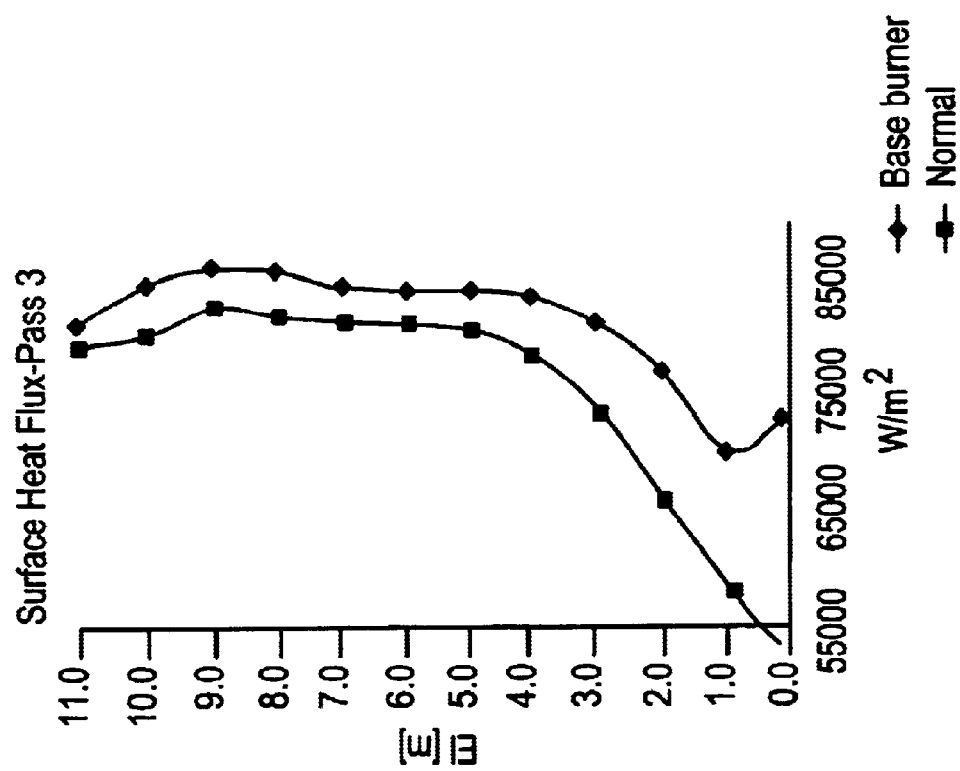
Figures 9A, 9B:
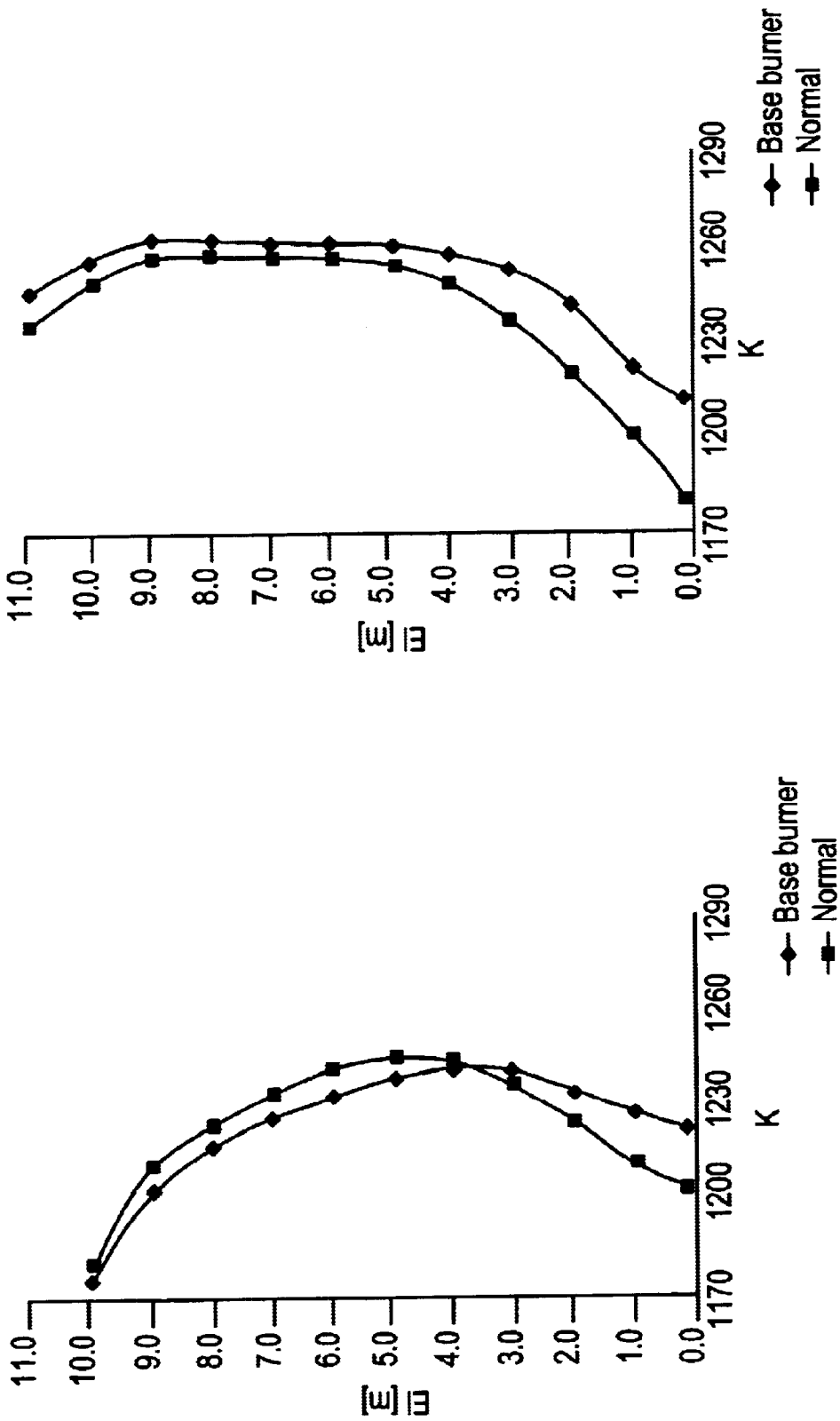
FIGS. 9A to 9D are graphs showing the average metal temperature also through the elevation of the heater for the four passes comparing a prior art heater with the heater of the invention as a function of the position along the coil length for the prior art.
Figure 9C:
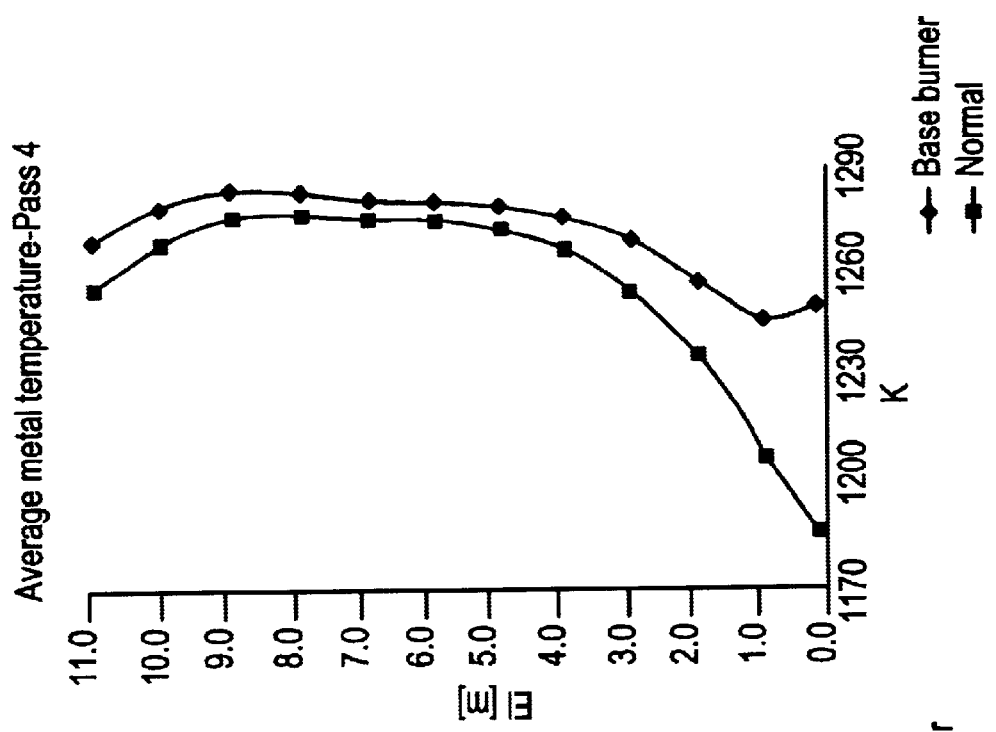
Figure 9D:
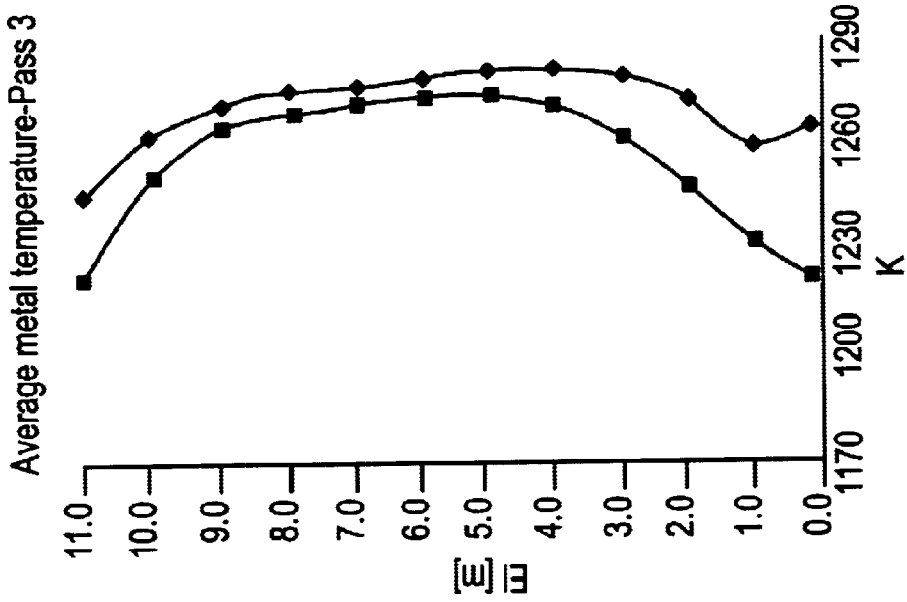

An alternate embodiment of the present invention uses porous refractory or ceramic burner blocks which also form at least a portion of the floor or hearth. A premixed fuel/air stream is fed to the burner and passes through the porous media. Combustion takes place essentially on the surface of the burner such that the burner face and hence the pyrolysis floor itself becomes a highly radiant surface. A typical ceramic burner is shown in FIG. 7 and comprises a casing 58 containing the porous ceramic block 60 and having an inlet 62 for the fuel/air mixture. The fuel/air mixture flows through the block 60 and combusts at the surface 64 forming the flame 66. These burners may also contain catalytic material. The advantage of these porous ceramic burners is that there is no direct flame on the floor since it is contained within the ceramic radiant surface. A further advantage is that the heat is added at extremely low $NO_x$ levels. These burners are essentially forced draft burners as opposed to the wall burners which are usually natural draft or inspirated burners. This contributes to the low $NO_x$ capability of the ceramic floor base burners. It should be noted that while two specific burner examples are described, the scope of the invention is not limited to these particular burners.

It is known that operating under substoichiometric conditions (reduced oxygen levels) will reduce $NO_x$ by reducing flame temperatures. The substoichiometric conditions also create a reducing environment that reduces $NO_x$. It is further known that staging the fuel (combusting the fuel at various levels) will reduce $NO_x$ by also reducing flame temperatures. In one option for operating this combined system, the base burner can be operated substoichiometric producing an effluent with unburned fuel and essentially no oxygen and minimal $NO_x$. Then this gas, because of its position on the floor and in proximity to the hearth burners would be entrained in the vertical flame from the hearth burners. The vertically fired hearth burner can be purposely operated with excess air. This would in itself lower flame temperature and reduce $NO_x$. The entrained fuel from the base burners would be combusted as it was entrained in the flow from the hearth burner. This combination of operating conditions could be reversed and the base burners operated with excess air and the hearth burners operated substoiciometrically. With either option, staging of the combustion process reduces the formation of $NO_x$. This combination would significantly reduce the overall $NO_x$ from the cracking heater for an equivalent heat release.

The floor of prior art pyrolysis heaters is not effectively utilized as a radiant surface. By heating the floor with the base burners of the present invention, the floor acts as a radiant surface thereby increasing the heat flux in the lower portion of the firebox and tending to equalize the heat flux profile throughout the height of the firebox. This can be seen in FIGS. 8A to 8D. These Figures present the heat flux profile for each of the four coil passes of the ethylene cracking heater for a so-called normal case which uses wall burners and hearth burners and the base burner case of the present invention using base burners, wall burners, and hearth burners only. The base burners are operated at a firing rate of 1 MM BTU/hr each. Thus, the overall firing is increased by a nominal 11% above the normal case where the hearth burners operate at 7.6 MM BTU/HR and the wall burners at 1 MM BTU/hr. Under these conditions, the feed to the coil is increased 11% as well resulting in a net 11% increase in radiant coil capacity. The surface tube metal temperatures are shown on FIGS. 9A to 9D. The maximum peak metal temperature for any pass has increased by only 6° C. for the case with 11% additional capacity. In practice, the firing rate for the base burner across from this pass could be reduced slightly to achieve equivalent metal temperatures with substantially higher overall coil capacity. If an equivalent capacity increase were to be achieved without a base burner, the hearth burner firing would have to be increased by 1 MM BTU/hr. Under these circumstances, the increase in peak tube metal temperature would be 20° C., equivalent to that shown in FIG. 3 where the 1 MM BTU/hr wall burner was turned off and the hearth burner firing increased by 1 MM BTU/hr. As stated above, this would have a significant negative effect of tube performance.

What is claimed is:

1. A pyrolysis heater for the pyrolysis of hydrocarbons comprising:
   a. a radiant heating zone having a bottom hearth, a lower portion adjacent to and extending upwardly from said hearth and an upper portion extending upwardly from said lower portion;
   b. at least one tubular heating coil for processing said hydrocarbons located in said radiant heating zone and extending into both said upper portion and said lower portion;
   c. a plurality of hearth burners located adjacent to said hearth directed upwardly for firing vertically up through said lower portion and into said upper portion; and
   d. a plurality of base burners located on said hearth for firing in contact with said hearth thereby creating a heated radiating hearth surface.

2. A pyrolysis heater as recited in claim 1 wherein said radiant heating zone includes walls and further including wall burners located on said walls in said upper portion.

3. A pyrolysis heater as recited in claim 1 and further including a convection section above said radiant heating zone.

4. A pyrolysis heater as recited in claim 1 wherein said base burners are directed for firing horizontally across and in contact with said hearth.

5. A pyrolysis heater as recited in claim 1 wherein said base burners comprise porous ceramic burners and wherein said porous ceramic burners comprise at least a portion of said hearth.

6. A heater for the pyrolysis of hydrocarbons in the production of olefins wherein said heater includes a radiant heating zone having a bottom hearth, a lower portion adjacent to and extending upwardly from said hearth and an upper portion extending upwardly from said lower portion and at least one tubular heating coil for processing said hydrocarbons located in said radiant heating zone and extending into both said upper portion and said lower portion and a combination of burners for increasing the uniformity of the heat flux in said lower and upper portions of said radiant heating zone and increasing the uniformity of the temperature of said heating coil, said combination of burners comprising:
   a. a plurality of hearth burners located adjacent to said hearth directed upwardly for firing vertically up through said lower portion and into said upper portion; and
   b. a plurality of base burners located on said hearth for firing directly on said hearth thereby creating a heated radiating hearth surface.

7. A heater as recited in claim 6 wherein said base burners are directed for firing horizontally across said hearth.

8. A heater as recited in claim 6 wherein said base burners comprise porous ceramic burners and wherein said porous ceramic burners comprise at least a portion of said hearth.

* * * * *